Figure 1:
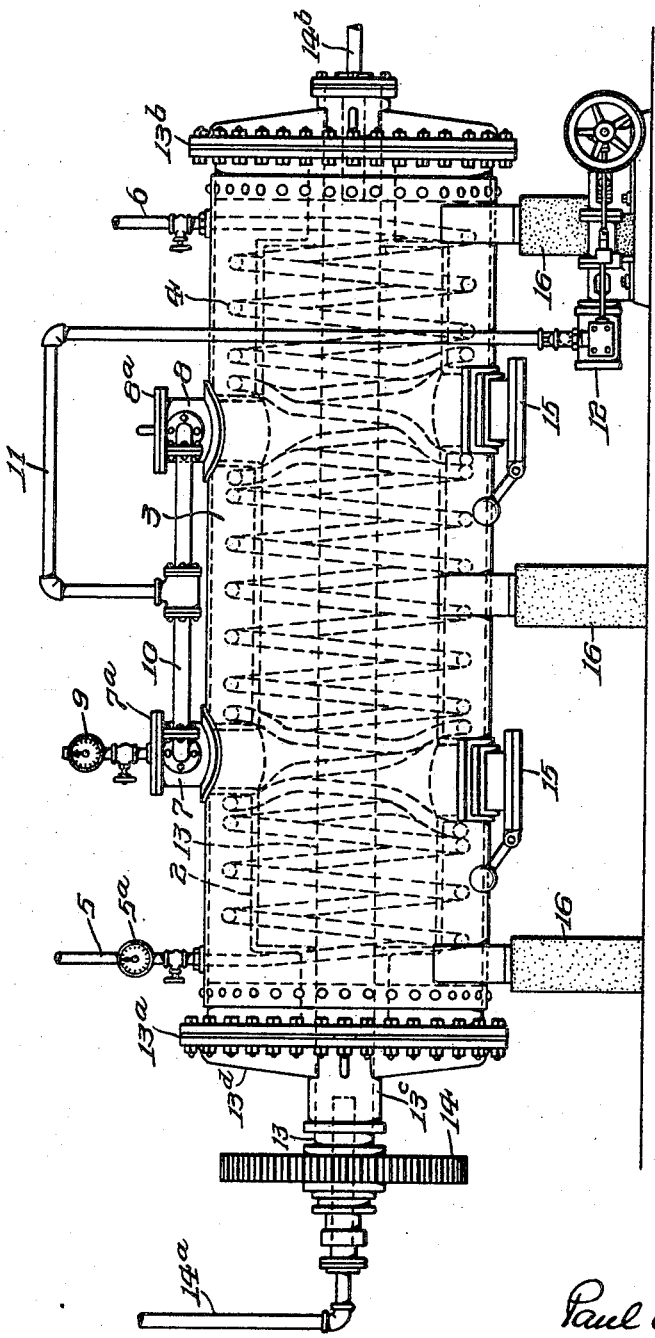

P. E. WOLL.
PROCESS OF CLEANING, DEODORIZING, AND DRYING FEATHERS.
APPLICATION FILED APR. 23, 1919.

1,402,823.

Patented Jan. 10, 1922.
2 SHEETS—SHEET 1.

INVENTOR
Paul E. Woll

WITNESS

BY
ATTORNEY

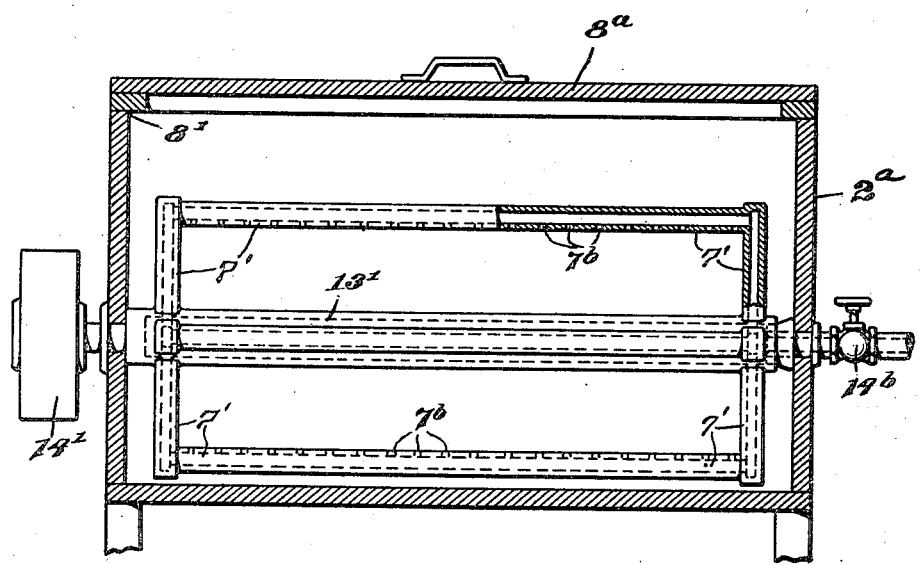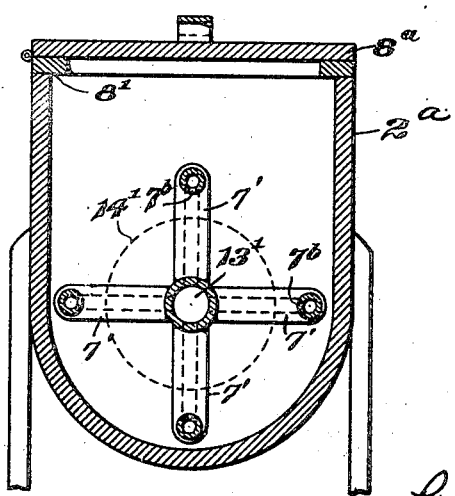

UNITED STATES PATENT OFFICE.

PAUL E. WOLL, OF PHILADELPHIA, PENNSYLVANIA.

PROCESS OF CLEANING, DEODORIZING, AND DRYING FEATHERS.

1,402,823.

Specification of Letters Patent. Patented Jan. 10, 1922.

Application filed April 23, 1919. Serial No. 292,116.

*To all whom it may concern:*

Be it known that I, PAUL E. WOLL, citizen of Philadelphia, State of Pennsylvania, have invented certain new and useful Improvements in Processes of Cleaning, Deodorizing, and Drying Feathers, of which the following is a full, clear, and exact description.

My invention relates to the cleaning and purification of feathers to render them adaptable for uses to which they are commonly applied, and has for its primary object the removal, from the stem and adjunctive parts, of the natural inherent odoriferous oils and the like which, when the feather later absorbs moisture to any extent, gives off disagreeable odors and hastens decomposition. Incidentally thereto another object of my process is to practically desiccate all those parts of the feather which are naturally hygroscopic to any degree by reason of the contained oily and other matter in the stem and adjunctive parts. A further object of my process, and to put the feather in the best condition for better accomplishing the primary object stated, is to preliminarily sweat them in a suitable vessel, to which comparatively dry steam is admitted, for the removal of all foreign matter which can be removed by a washing, especially under agitation.

In the accompanying drawings illustrating mechanical means well adapted to carry out my process, Fig. 1 is a longitudinal section, partly in elevation, of a vacuum dryer, and Figs. 2 and 3 are respectively longitudinal and transverse sections, of a renovator for cleaning and sweating feathers.

The most common use to which feathers are applied is for stuffing mattresses and other bedding, pillows, sofa cushions, and the like, and such feathers used are generally those of the chicken, duck and geese, frequently admixed. The feathers of wild aqueous birds are practically valueless for the purpose and not used for the reason that they contain to a still greater extent the odoriferous oils and matter referred to, and which my process is capable of effectually removing.

The best known method and now commonly employed for cleaning feathers, is sweating them by wet steam, in a suitable vessel, and at same time agitating them therein, employing also an air current, produced by a fan blower, delivered through a perforated conduit, to separate and drive off the physical impurities; after which, they are dried, under atmospheric pressure only, by merely continuing the agitation and fanning; but this process does not remove the natural odoriferous oils in the stem of the feather, and, per consequence, the odors resulting therefrom, nor does it thoroughly dry them, which is essential, in a less degree only, to prevent natural decomposition, eventually producing a musty odor, as feathers are exceedingly difficult to dry, especially under atmospheric pressure; they are hygroscopic in character, and more or less of the moisture absorbed in the inner portions of the stem and adjunctive parts which carry the odoriferous matter will be retained under any usual drying treatment.

This, the prevailing method, while securing cleanliness of the resultant feathers, necessarily fails to remove the odoriferous oils in the feather and, because the drying is under atmospheric pressure, also fails to thoroughly dry it.

I have discovered that by subjecting the feathers to a high temperature, in a vacuum, and drawing off the moisture and volatilized or vaporized oil matters thereby released, that two new results will follow, namely the odoriferous constituent oily matter, will be effectively removed, and the moisture retaining parts of the feather will be practically desiccated. The temperature must be high and it must be applied in a substantial vacuum. This is the essence of my process, and the raw feathers after merely sorting and physically removing adhering foreign matters, may be so acted on, with excellent results; but as a preferred preliminary step I subject the feathers, after the aforesaid sorting to a sweating, but with steam which is preferably dry or not saturated. In carrying out this preferred first step I employ a suitable vessel, for which purpose I can use the renovator now commonly employed for the purpose, the requisites being that it shall contain means to receive live or dry steam, and preferably that it shall contain means to agitate the feathers during the sweating. If the feathers contain any foreign matter removable only, or more speedily, by washing or chemical solvents, there is nothing inconsistent with my process in the preliminary use of the same. My process differs from the old in two characteristic respects; the preliminary cleaning by sweating under agitation is to be done by comparatively dry steam; the second step is effected by heating in a vacuum. The former needs no fanning as an adjunct, when used as a preliminary step in my process, and the latter thoroughly dries the feather even to the moisture usually retained in the stem and adjunctive parts in addition to its primary function of volatilizing or otherwise driving off the odoriferous oils and fats inherent in the composition of the stem and adjunctive parts.

After the feathers have been preliminarily treated by the sweating action of comparatively dry steam in a suitable vessel preferably provided with rotatable beaters or the like, they are in the best and most suitable condition for being acted on by the characteristic step of my process to produce the novel results stated. I will now describe the process, as a whole, as I prefer to practice it. I employ for the preferred first or preliminary step a suitable vessel, such as the renovator now commonly employed for cleaning feathers, which is provided with means to receive live or comparatively dry steam, and preferably with rotatable beaters to agitate the feathers, but I can and do eliminate the blower or fan.

After the feathers have been sweated, under the action of comparatively dry steam, in such a machine, they are removed and subjected to the second or characteristic step of my process, for which purpose I can use any of the well known vacuum dryer machines on the market capable of producing a more or less perfect vacuum and heating by steam coils. I can however use such an apparatus successfully for both steps, especially if it be of the rotary type to agitate the feathers during the preliminary step of sweating, in such case, however, introducing steam directly to sweat the feathers instead of introducing it through the coils to heat them, and, of course, not operating the above mentioned adjunctive devices thereof to draw off the air and create a partial vacuum therein. I have found, as suitable for the second or novel characteristic step of my process that subjecting the feathers in the vacuum dryer to a temperature produced by about 50 lbs. steam pressure passing through the heating coils, in a vacuum of about 29° for a period of about four hours, will ordinarily produce the results stated. Apparently it is the lighter oils and fatty matter in the feather which produces the objectionable odor; that these, of high boiling point, volatilize or vaporize readily in a vacuum, after the moisture in the feather has been eliminated, and I have also found that if a rotary type of vacuum dryer is used, that agitation will facilitate the drying, which however is speeded and made effectual in a vacuum, and which is impossible to effect completely under atmospheric pressure; moreover the usual adjunctive parts of the vacuum dryer for exhausting contained air to create the partial vacuum is utilized to draw off the volatilized or vaporized constituent oils in the feather as well as the moisture.

I will not describe an apparatus suitable for practicing the characteristic steps of my process and constituting the novel method forming the subject matter of the appended claims.

Referring to Fig. 1 of the annexed drawing—an inner fixed cylinder indicated at 2 is jacketed at 3, and between them is a coiled steam heating pipe 4 surrounding the cylinder, the inlet 5 of this coiled pipe is provided with a steam gauge 5$^a$, and the exhaust pipe of which is indicated at 6. A pair of inlets indicated at 7 and 8 extend into the inner cylinder 2, to provide access thereto for the feathers to be treated. The inlets are provided with hinged closures 7$^a$ and 8$^a$, one of which is provided with a vacuum gauge 9. These inlet devices are shown connected by a pipe 10, which leads through a pipe 11 to an air-exhaust pump 12. As an alternative means of heating the cylinder, or additional thereto if desired to speed the heating, there may be provided, as shown in the drawing, a rotatable heating tube 13 which extends through the cylinder and through the stuffing boxes 13$^c$ and has its bearings therein and in the cylinder heads 13$^a$, 13$^b$, and operates as a tubular shaft, on which is mounted a geared driving wheel 14. Steam is supplied to such tubular shaft by a steam pipe 14$^a$, which exhausts through steam pipe 14$^b$. Discharge means, indicated at 15, 15, for the more ready removal of the contents of the cylinder may be provided, as shown. The device, as a whole, may be supported on concrete standards, indicated at 16, 16, and, of course, means, not shown, may be provided to drive the geared driving wheel 14 which rotates the inner rotatable tubular heating shaft.

If it is preferred to use a renovator as a separate device for the preliminary step of sweating the feathers to clean them, a suitable device for that purpose is illustrated in Figs. 2 and 3 of the drawing, wherein is shown in longitudinal and transverse sections, respectively, a tank 2$^a$ with an inlet and discharge opening 8' and a removable cover 8$^a$ therefor, a hollow and rotatable perforated shaft 13' passing through the rounded part of the tank, valvular means such as 14$^b$ to admit steam to the hollow shaft, means such as pulley 14' to rotate the shaft, and hollow beaters such as hollow pipes 7' mounted on the shaft and perforated as at 7ᵇ, to discharge steam to the tank and to circulate the feathers in the tank during the washing operation.

Having thus described my invention, I claim:

1. The process described of deodorizing and drying feathers which consists in volatilizing the oily constituents in the stem and adjunctive parts by subjecting them to the action of a dry atmosphere at a high temperature in a suitable container wherein an approximate vacuum is maintained during the heating and simultaneously drawing off the oily constituents and moisture liberated said high temperature.

2. The process described of cleaning, deodorizing and drying feathers, which consists in sweating them by the action of steam in a suitable vessel, and then vaporizing the oily and fatty matters inherent in the stem and adjunctive parts of the feathers and thoroughly drying them, by subjecting them to the action of a dry atmosphere at a high temperature in a suitable container wherein an approximate vacuum is created during the drying of the article therein.

In testimony whereof, I have hereunto affixed my signature this 22nd day of April, A. D. 1919.

PAUL E. WOLL.

Witness:
ALEXANDER PARK.